Figure 1:
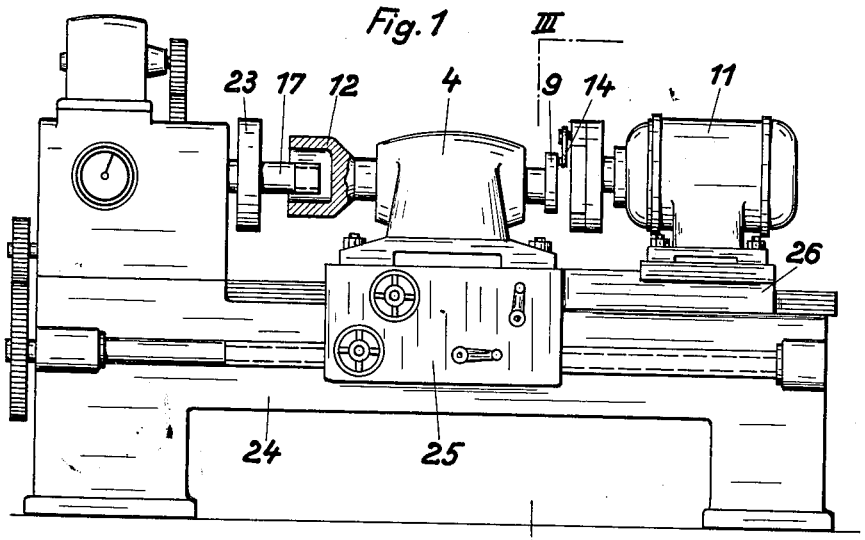

March 27, 1956  K. H. BURGSMÜLLER  2,739,510
CRANK DRIVEN ARRANGEMENT
Filed April 23, 1952  4 Sheets-Sheet 1

INVENTOR
KARL HEINRICH BURGSMÜLLER
BY James J. Cannon
ATTORNEY

March 27, 1956  K. H. BURGSMÜLLER  2,739,510
CRANK DRIVEN ARRANGEMENT
Filed April 23, 1952  4 Sheets-Sheet 2

INVENTOR
KARL HEINRICH BURGSMÜLLER
BY James J. Cannon
ATTORNEY.

March 27, 1956  K. H. BURGSMÜLLER  2,739,510
CRANK DRIVEN ARRANGEMENT
Filed April 23, 1952  4 Sheets-Sheet 3
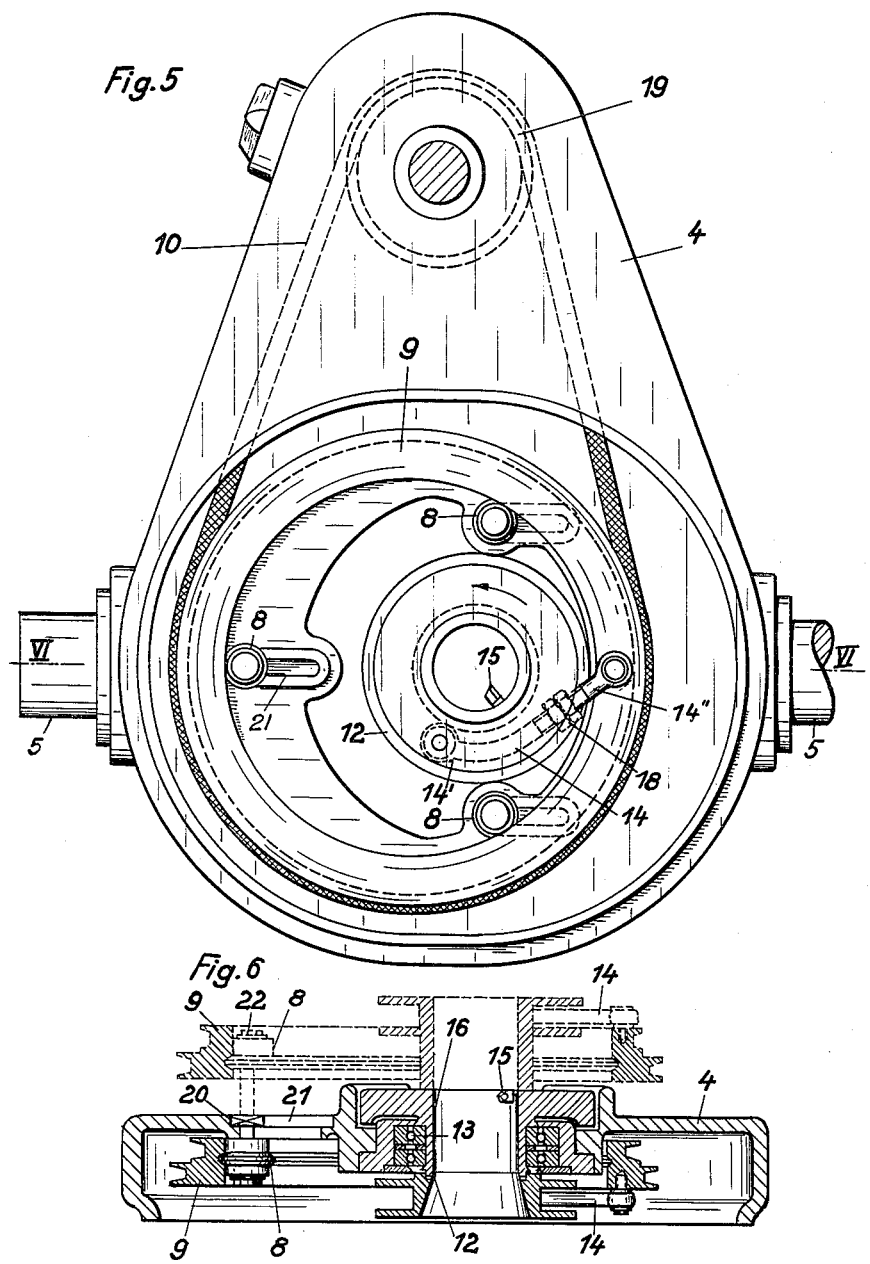
INVENTOR
KARL HEINRICH BURGSMÜLLER
BY; James J. Cannon
ATTORNEY March 27, 1956   K. H. BURGSMÜLLER   2,739,510
CRANK DRIVEN ARRANGEMENT Filed April 23, 1952                                          4 Sheets-Sheet 4

INVENTOR

KARL HEINRICH BURGSMÜLLER

BY James J. Cannon

ATTORNEY

United States Patent Office 2,739,510
Patented Mar. 27, 1956

2,739,510

CRANK DRIVEN ARRANGEMENT

Karl Heinrich Burgsmüller, Kreiensen am Harz, Niedersachsen, Germany, assignor to Gomerue Establishment, Vaduz, Lichenstein Application April 23, 1952, Serial No. 283,889

3 Claims. (Cl. 90—11.64)

This invention relates to driving arrangements for rotating cutting tools or the like, more particularly, a crank driven arrangement for the cutting of threads. In the cutting operation it is sometimes preferred to drive such tools during their circular path at a non-uniform rate of speed, allowing the cutting tool to travel through an idle path at a higher rate of speed than through a cutting path, in preference to a multiple of cutting tools traveling at a constant rate of speed.

The object of the present invention is to provide simple means for driving cutting tools, at said non-uniform rate of speed.

In the present invention the drive comprises a driving crank ring rotating at a constant rate of speed, an intermediate adjustable link member, a tool holder ring located eccentrically to the driving crank ring, a cutting tool whose cutting edge travels in a circular path and whose axis is located eccentrically in relation to the axis of a workpiece which workpiece is also rotating about its axis.

In a preferred form of the invention, the drive consists of two rings located eccentrically to each other. One of said rings acts as a driving crank of the other ring by means of an adjustable link, the driven ring serves as a tool holder. The two rings may be mounted in a single case; said case is adjustable about a vertical and/or a horizontal axis and may be fixably attached to the slide-rest or carriage of a lathe, or any like machine tool.

The said case may hold a driving pulley, said pulley rotating the driving ring by means of a driving belt, or said case may hold a motor on whose shaft the driving ring may be mounted directly.

A further feature of the invention is that the eccentricity between the circular path of the crank, and the circular path of the driving ring, may be adjustable. The length of the link member may also be adjustable.

Other and further objects, features and advantages of the invention will be pointed out hereinafter and appear in the appended claims forming part of the application. In the accompanying drawings a preferred embodiment of the invention is shown by way of illustration and not by way of limitation.

Figure 2:
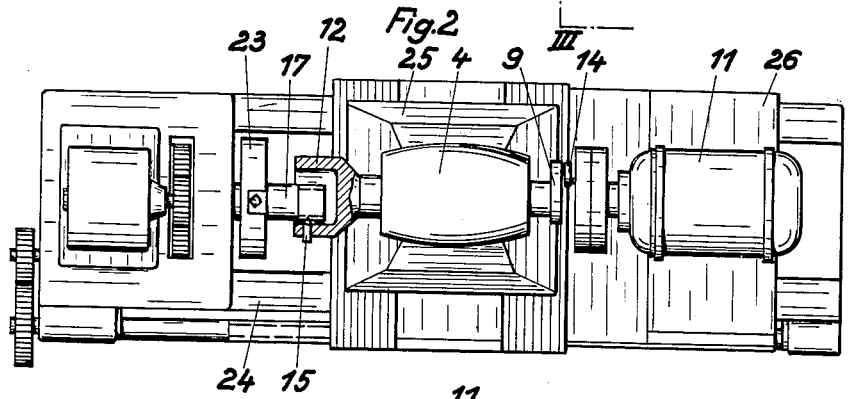
Figure 1A:
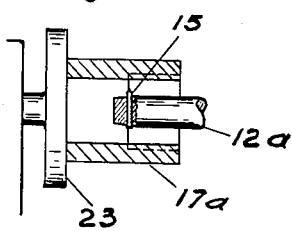
Figure 3:
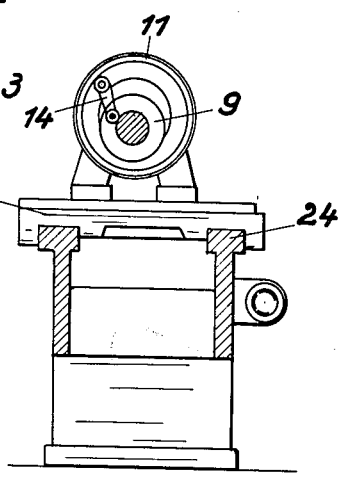
Figure 4:
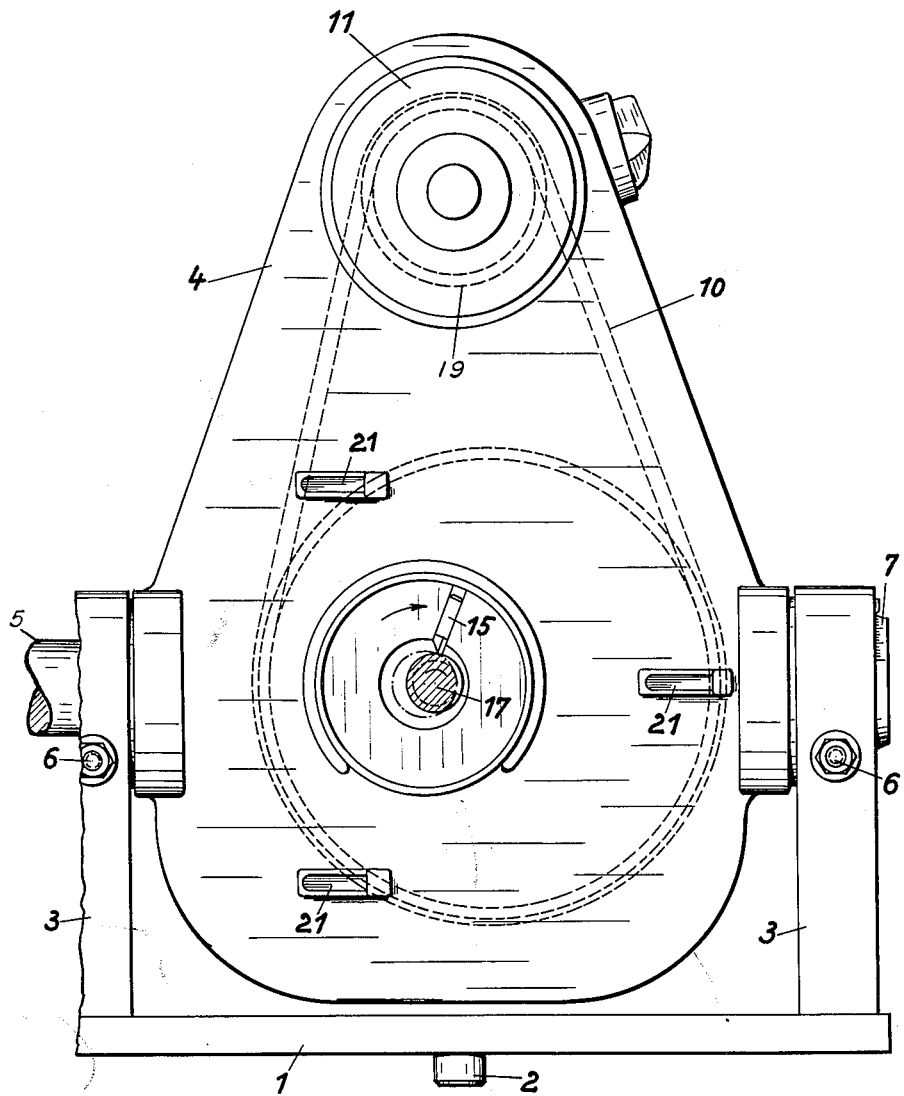
Figure 7:
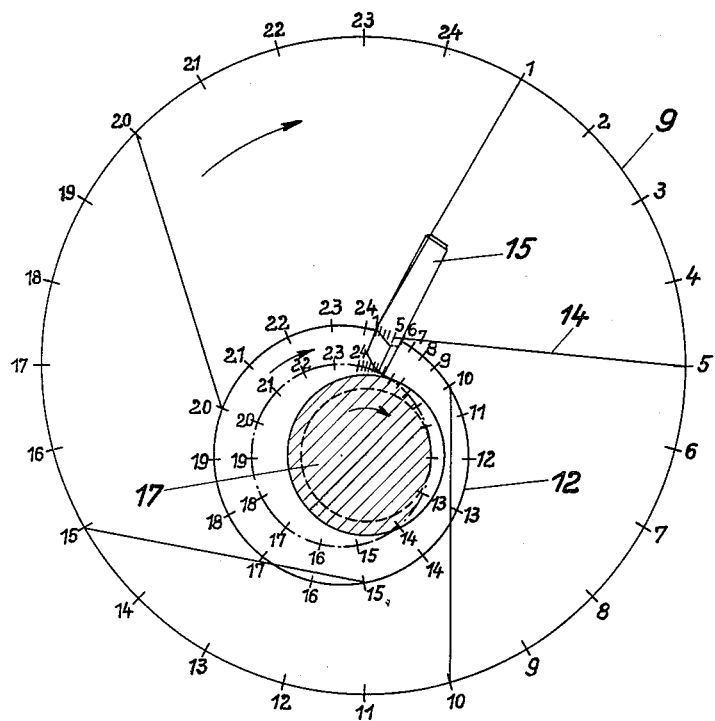

Fig. 1 is a side view of a device for cutting short external threads on a standard lathe with the tool holder ring directly driven by an electric motor, Fig. 1a is a partial view of a device for cutting internal threads, Fig. 2 is a plan view of Fig. 1, Fig. 3 is a section on line III—III of Fig. 1, Fig. 4 is an end view of the driving device for cutting long external threads, Fig. 5 is an end view, showing the opposite end of the device shown in Fig. 4, Fig. 6 is a section on line VI—VI of Fig. 5, and Fig. 7 is a diagram indicating the kinematics of the device.

Similar reference numerals denote similar parts in the different views.

Reading on the drawings and particularly on Figs. 1 to 3, workpiece 17, or 17a is held in chuck 23, of lathe 24. Cutting tool 15, held in bell-shaped tool holder ring 12, or fly arbor 12a, having its shaft set for rotation in case 4, mounted on the cross slide 25, of lathe 24, in such manner that tool holder ring 12, or fly arbor 12a, is located eccentrically to axis of the workpiece 17, or 17a, so that cutting tool 15, removes a short chip only from workpiece 17, or 17a, with each revolution. The shaft, carrying tool holder ring 12, or fly arbor 12a holds at its opposite end driving ring 9, driven directly by motor 11, through link 14. Motor 11 is mounted on support 26, of cross slide 25. Said support is guided on the bed of lathe 24. Workpiece 17, or 17a, in chuck 23, is slowly rotated by lathe 24, while tool holder ring 12, or fly arbor 12a, with cutting tool 15, circles around, or inside, said workpiece 17, or 17a, at high speed, removing from said workpiece 17, or 17a, a short chip only with each revolution of said tool holder ring 12, or fly arbor 12a.

Reading on Fig. 4, and Fig. 1, base plate 1, of case 4, can be mounted rotatably and fixably on cross slide 25, of lathe 24, by means of pivot 2.

Base plate 1 has two bearing brackets 3, for mounting case 4, therein to swing on horizontal journals 5, and being fixable by means of screws 6. Annular scale 7 is located on one of the journals 5, for adjusting the angle of inclination of said case 4.

Reading on Figs. 4, 5, and 6, the case 4 holds several guide rollers 8, for ring 9, made in the form of a step-pulley and driven by belt 10, from driving pulley 19. Said driving ring 9 can be shifted in relation to case 4, for varying the eccentricity between the axis of said driving ring 9, and the axis of said tool holder ring 12, by means of slide blocks 20, engaging in longitudinal slots 21, and set by screws 22. Arranged within ring 9, eccentrically thereto, is ring 12, mounted on ball bearing 13, seated in case 4. Said ring 9, and said ring 12, are coupled to each other by link 14, consisting of two parts 14', and 14'', which are threaded together so that the length of the link 14 can be adjusted and locked in position by lock nuts 18. With this adjustment, the starting point of the cut on the workpiece 17, or any other point on its cutting path, can be made to coincide with the point of minimum cutting speed of tool 15. The inner ring 12 serves as holder for a cutting tool 15.

Reading on Figs. 4, 6, and 7, ring 9, set in uniform rotation by motor 11, pulley 19, and belt 10, transmits the driving power to ring 12, through link 14, resulting in a non-uniform rotation. The kinematics of the drive shown diagrammatically in Fig. 7, gives the relative positions of rings 9, and 12, for various positions of link 14.

Tool 15 rotates eccentrically around workpiece 17, at a relatively high rate of speed through its long idle path and at a relatively low speed through its short cutting path.

By maintaining a suitable ratio between the rotational speeds of tool holder ring 12, and of workpiece 17, said ratio governing the feed of the tool 15, a short chip only will be removed from the workpiece 17, with each revolution of said tool 15, around said workpiece 17. By changing the eccentricity between the axis of driving ring 9, and the axis of tool holder ring 12, this novel construction makes it possible to vary the speed ratio between the idle path and the cutting path within wide limits, and also permitting large speed variations during the cutting path of tool 15.

In the drive as illustrated, non-symmetrically acting forces may have harmful effects. In special cases a modification of the drive may be necessary to eliminate said disadvantage, by providing a pair of links 14, to act symmetrically on both sides of tool holder ring 12. A drive of this type is indicated in dotted lines in Fig. 6.

While the invention has been described in detail with respect to a preferred example and embodiments of the invention it will be understood by those skilled in the art after understanding the invention that various changes and modifications may be made without departing from the spirit and scope of the invention and it is intended, therefore, to cover all such changes and modifications in the appended claims.

What is claimed is:

1. An adjustable crank drive in a thread cutting device of the kind described, comprising, in combination, a movable case for mounting on the cross feed slide of a lathe, a tool holder ring with a cutting tool mounted for rotation on ball bearings in a hub of said case, a driving ring being larger than said tool holder ring and having an inner race engaging a set of adjustable guide rollers, said driving ring driven by means of a belt and rotating within said case on said adjustable guide rollers, the axis of said driving ring is located parallel and eccentrically with respect to the axis of said tool holder ring, said driving ring is joined together with an adjustable link member to said tool holder ring to form an adjustable crank drive, said adjustable guide rollers mounted by means of slide blocks movable in longitudinal slots located in said case for varying and adjusting the eccentricity between said driving ring and said tool holder ring, said link member being adjustable longitudinally for positioning said cutting tool angularly with respect to a workpiece.

2. In a device according to claim 1, wherein a dual adjustable crank drive with a pair of adjustable link members provides a symmetrical jointed connection between a pair of driving rings and an extended tool holder ring.

3. The method for driving a rapidly rotating cutting tool, as herein described, for machining a slowly rotating workpiece, said cutting tool rotating at a variable rate of speed and eccentrically around said workpiece, and engaging said workpiece intermittently over a small portion only, the speed ratio being adjustable between the cutting and non-cutting cycles, also the positioning of the point of minimum speed of said cutting tool being adjustable within said cutting cycle.

References Cited in the file of this patent

UNITED STATES PATENTS

| | | |
|---|---|---|
| 305,520 | Juengst | Sept. 23, 1884 |
| 1,295,756 | Johnson | Feb. 25, 1919 |
| 1,507,235 | Hall | Sept. 2, 1924 |
| 1,888,792 | Cottrell | Nov. 22, 1932 |

FOREIGN PATENTS

| | | |
|---|---|---|
| 440,786 | France | July 20, 1912 |
| 48,833 | Sweden | July 3, 1919 |
| 43,802 | Switzerland | May 23, 1908 |